United States Patent [19]
Sweger

[11] 3,767,936
[45] Oct. 23, 1973

[54] ANTICIPATING THERMOSTATIC TRANSMITTER

[75] Inventor: Russell P. Sweger, Rockford, Ill.

[73] Assignee: Barber-Colman Company, Rockford, Ill.

[22] Filed: May 8, 1972

[21] Appl. No.: 251,151

[52] U.S. Cl.............. 307/117, 236/68 B, 165/27, 337/361, 337/305
[51] Int. Cl. ............................................ H01h 35/00
[58] Field of Search .................... 236/1 C, 91, 68 B; 165/27; 337/361, 305; 307/116, 117, 149

[56] References Cited
UNITED STATES PATENTS
2,769,061  10/1956  White et al. ..................... 337/361
3,284,002  11/1966  Edelman et al. ................... 236/68 B Primary Examiner—Herman J. Hohauser
Attorney—A. Richard Koch

[57] ABSTRACT

A controllable switching device closes and opens a series circuit comprising a power supply and a receiver. The switching device is controlled by an on-off thermostat responsive to both the ambient temperature and an anticipating heater, the energization and deenergization of which is controlled by the switching device. The result of use of such an anticipating thermostatic transmitter is the production of an on-off time proportioned current in the series circuit.

10 Claims, 2 Drawing Figures

3,767,936

ANTICIPATING THERMOSTATIC TRANSMITTER

BACKGROUND OF THE INVENTION

This invention pertains to a transmitter useful in providing a temperature responsive on-off time proportioned signal in a transmitter-receiver system such as is described in my pending application Ser. No. 128,890, filed on Mar. 29, 1971, now Pat. No. 3,662,241, issued on May 9, 1972. It is primarily intended for use in space conditioning systems to position values and dampers regulating the flow of conditioning fluid as a function of sensed ambient temperature. Prior transmitters, as disclosed in my pending application Ser. No. 146,117 filed on May 24, 1971, now Pat No. 3,667,539, issued on June 6, 1972, had more components and were relatively expensive.

SUMMARY OF THE INVENTION

According to this invention an on-off thermostat is employed as a pilot to control conduction of a controllable switching device adapted to complete a series circuit through a source of current and a receiver, or load. The controllable switching device also controls energization of a heater in heat transfer relation to the temperature responsive element in the thermostat to provide heat anticipation and so reduce or eliminate overshoot. The anticipatory heater causes the thermostat and the controllable switching device to repeatedly open and close their controlled circuits, the ratio of the lengths of on to off times varying in accordance with the deviation of sensed ambient temperature from setpoint temperature. The current drawn by the transmitter in absence of conduction by the controllable switching device is insufficient to energize the load. Only two conductors are required to connect the transmitter into external circuits, and in many applications the conductors may be connected interchangeably.

DESCRIPTION OF THE PREFERRED EMBODIMENTS

Figure 1:
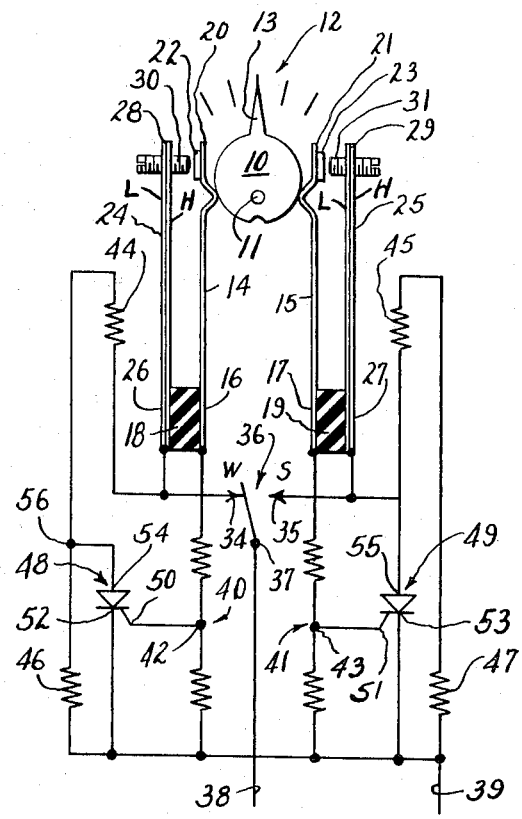
FIG. 1 is a schematic circuit diagram of a summer-winter anticipating thermostatic transmitter according to a preferred embodiment of the invention.

As shown in FIG. 1, a cam 10 is rotatable about a pivot 11 to any selected attitude which may be indicated as the setpoint on a fixed scale 12 by a pointer 13, integral with the cam. A pair of leaf springs 14, 15 are mounted in cantilever fashion at ends 16, 17 on insulating supports 18, 19 and have their remote ends 20, 21 biased against the cam 10. A pair of relatively fixed contacts 22, 23 on the remote ends 20, 21 are moved by rotation of the cam to positions determined by the selected attitude of the cam. A pair of thermostatic bimetal strips 24, 25 have ends 26, 27 affixed to the supports 18, 19 and free ends 28, 29 adjacent the remote ends 20, 21. A pair of contacts 30, 31 on the free ends 28, 29 are movable by deflection of the bimetals 24, 25 into and out of engagement with the fixed contacts 22, 23, respectively. The bimetal 24 has its high expansion side H facing the spring strip 14, so that the contacts 22, 30 tend to separate upon an increase in temperature, while bimetal 25 has its low expansion side L facing the spring strip 15, so that the contacts 23, 31 tend to close upon an increase in temperature. The contacts 30, 31 are shown as adjustable. The thermostat described above is well known in the art.

In the circuit of FIG. 1, the bimetals 24, 25 are connected to alternate contacts 34, 35 of a single-pole, double-throw switch 36, the common terminal 37 of which is connected to a conductor 38, while the leaf springs 14, 15 are joined to a conductor 39 through voltage dividers 40, 41 having taps 42, 43. Heaters 44, 45, in good heat transfer relation with bimetals 24, 25, are connected to the alternative contacts 34, 35, and through resistors 46, 47 to conductor 39. Semiconductor controlled rectifiers 48, 49 (hereinafter referred to as SCRs) have their gates 50, 51 connected to the taps 42, 43, and their cathodes 52, 53 joined to conductor 39. The anode 54 is connected to junction 56 between heater 44 and resistor 46, while anode 55 is connected to alternative contact 35. SCR 54, therefore, is in series with heater 44 and shunts resistor 46, while SCR 55 shunts both heater 45 and resistor 47.

The conductors 38, 39 are connected in a series circuit with a source of pulsating current, which may be alternating or direct, and a receiver.

During the heating season, the single-pole, double-throw switch 36 is thrown to its winter position W with common terminal 37 connected to alternative contact 34, completing a circuit from conductor 38 through common terminal 37, alternative contact 34, heater 44 and resistor 46 to conductor 39. If contacts 22, 30 are open, the circuit just described is the only completed circuit. The resistor 46 keeps the current low enough so that heat generated in heater 44 is negligible. When the ambient temperature is reduced so that contacts 22, 30 close, a control circuit is completed from conductor 38 through common terminal 37, alternative contact 34, bimetal 24, contacts 30, 22, spring 14 and voltage divider 40 to conductor 39, establishing at tap 42 a potential with respect to conductor 39. When gate 50, coupled to tap 40, is positive with respect to cathode 52, connected to conductor 39, the SCR 48 is fired, substantially shorting out resistor 46 and greatly increasing the current through heater 44, so that heat generated by the heater increases the temperature of bimetal 24 until contacts 22, 30 are opened by the resulting deflection of the bimetal. As soon as the contacts 22, 30 open, the control circuit is disabled and the SCR 48 ceases conduction when the forward voltage between anode 54 and cathode 52 drops to substantially zero. The attitude of cam 10 determines the fixed position of contact 22 and establishes the temperature setpoint. The position of contact 30 is controlled by the deflection of bimetal 24 resulting from ambient temperature in absence of heat generated by heater 44 and by both ambient temperature and generated heat when the SCR 48 is conducting heater current. The effect of the generated heat is to anticipate changes in ambient temperature. The deflection of bimetal 24 resulting from the generated heat is such that the contacts 22, 30 are opened shortly after they close, resulting in repeated open and close operations when the ambient temperature is below the setpoint. When the ambient temperature is low, more heat is required to separate contacts 22, 30 causing the on-time (SCR 48 conducting) to be longer than the off-time (SCR 48 non-conducting). It is to be understood that, when the SCR 48 is non-conducting, there is insufficient current drawn through the series connected load to effect energization of the load. When SCR 48 is conducting it provides substantially no restrain to current through the series connected load, so that the latter is energized. As the ambient temperature rises toward the setpoint, less heat is required to separate the contacts and the ratio of on to off times is reduced.

During the cooling season the switch 36 is thrown to the summer position S, with the common terminal 37 connected to the alternative contact 35, completing a circuit from conductor 38 through common terminal 37, alternative contact 35, heater 45 and resistor 47 to conductor 39. If contacts 23, 31 are open, the circuit described is the only completed circuit. In contrast to winter operation, the heat generated in heater 45 does affect the bimetal 25, providing anticipation. When the ambient temperature and the heat generated in heater 45 raise the temperature of bimetal 25 sufficiently to close contacts 23, 31, a control circuit is completed from conductor 38 through common terminal 37, alternative contact 35, bimetal 25, contacts 31, 23, spring 15 and voltage divider 41 to conductor 39, establishing at tap 43 a potential with respect to conductor 39. When gate 51, coupled to tap 43, is positive with respect to cathode 53, connected to conductor 39, the SCR 49 is fired, substantially shorting out heater 45 and rendering it ineffective as a source of heat. The removal of this source of heat causes the bimetal 25 to open contacts 23, 31 sooner than if the source of heat were still effective, disabling the control circuit and thus causing SCR 49 to cease conduction when the forward voltage between anode 55 and cathode 53 drops to substantially zero. The contacts 23, 31 open shortly after they close, resulting in repeated open and close operations when the ambient temperature is above the setpoint. When the ambient temperature is high, less heat is required to close contacts 23, 31, causing the on-time to be longer than the off-time. As the ambient temperature falls toward the setpoint, less heat is required to close the contacts and the ratio of on to off times is reduced.

It will be noted that as the setpoint is approached from the low side during the heating season, or from the high side during the cooling season, the ratio of on to off times is reduced, so that the invention lends itself to valve control in closed loop hot and chilled fluid systems or to damper control in tempered air systems. The single-pole, double-throw switch 36 may be manually operated or it may be automatically operated in response to the presence of hot or chilled fluid in the system. Each side of the thermostatic transmitter operates independently of the other, so that the heating and cooling transmitters may be separated and used individually in control of heating and cooling systems respectively.

Figure 2:
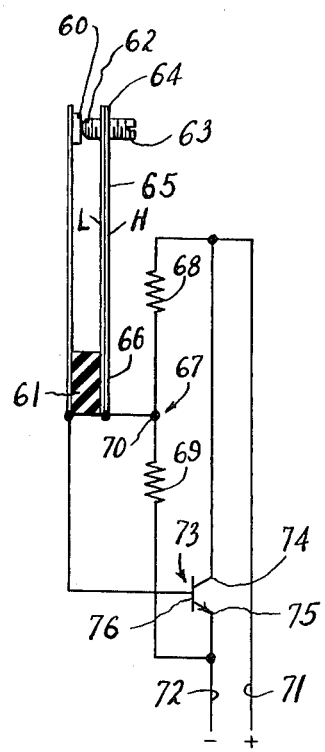
FIG. 2 is a schematic circuit diagram of a cooling anticipating thermostatic transmitter according to another embodiment of the invention.

FIG. 2 shows a stationary contact 60 mounted on an insulating support 61 and a movable contact 62 adjustably supported as by a screw 63 on the free end 64 of a bimetal strip 65, mounted in cantilever fashion at end 66 on the insulating support 61. This is substantially identical to the mechanical portion of the cooling control in FIG. 1. A voltage divider 67 comprising a heater 68 and a resistor 69 joined at tap 70 is connected between positive (+) and negative (−) conductors 71, 72. A PNP switching transistor 73 has its collector 74 connected to the positive (+) conductor 71 and its emitter 75 connected to the negative (−) conductor 72 to parallel the voltage divider 67. The base 76 is connected to stationary contact 60. Tap 70 is connected to the bimetal 65.

When contacts 60, 62 are open, current flows from conductor 71 through heater 68 and resistor 69 to conductor 72, energizing the heater and providing a positive voltage at tap 70. Heat generated by heater 68 causes bimetal 65 to be deflected to the left, as shown, moving contact 62 toward stationary contact 60. If the ambient temperature is high enough, the contacts will close a circuit from tap 70 through bimetal 65, screw 63 and contacts 62, 60 to base 76. Since base 76 will then be positive with respect to the emitter 75, the transistor 73 will conduct current from positive conductor 71 through collector 74 and emitter 75 to negative conductor 72 in sufficient amount to energize the series connected load. Conduction through transistor 73 greatly reduces the current through heater 68, allowing bimetal 65 to return to the right, as shown, and open the contacts 60, 62. The reduction in heater current is insufficient to reduce the voltage at base 76 to fall below that required to sustain conduction through the transistor 73 until the contacts 60, 62 open, at which time all voltage is removed from base 76 and conduction through transistor 73 ceases. Once again the ratio of on to off times decreases as the setpoint (established in this embodiment by screw 63) is approached.

It will be obvious to those skilled in the art how NPN switching transistors or other similar devices could be substituted for the PNP transistor 73 in controlling direct current, how other thyristors could be substituted for the SCRs 48, 49 in controlling pulsating current and how bidirectionally conducting thyristors can be employed instead of SCRs 48, 49 to control alternating current. Switching transistors and thyristors are controllable solid-state semiconductor switching devices. It will also be obvious to those skilled in the art that thermostatic bellows, rod and tube devices, and other temperature deformable elements could be substituted for the bimetals 24, 25, 65. Other deflecting means and trigger voltage supply means could be substituted for the heaters 44, 45, 68 and voltage dividers 40, 41, 67, respectively. It must be understood that the embodiments described are merely preferred embodiments and that the scope of the invention is defined by the claims.

I claim:

1. An anticipating thermostatic transmitter for connection in a series circuit with a power supply and a receiver, said transmitter comprising a temperature deformable element, said element having a mounted end and a free end, a first contact movable by the free end, a second contact in a predetermined position and engagable by said first contact, a first conductor and a second conductor for connecting the transmitter into said series circuit, deflecting means coupled between the conductors and energizable therefrom to deflect said element, a controllable switching device controlling energization of the deflecting means and completing said series circuit, and trigger voltage supply means coupled between said conductors and controllable by said contacts for selectively closing the switching device.

2. An anticipating thermostatic transmitter according to claim 1 wherein said controllable switching device comprises a controllable solid state switch.

3. An anticipating thermostatic transmitter according to claim 1 wherein said controllable switching device comprises a thyristor.

4. An anticipating thermostatic transmitter according to claim 1 wherein said controllable switching device comprises a transistor.

5. An anticipating thermostatic transmitter according to claim 1 wherein said trigger voltage supply means is in series with the contacts between the conductors.

6. An anticipating thermostatic transmitter according to claim 1 wherein said trigger voltage supply means is coupled through said contacts to control conduction of the switching device.

7. An anticipating thermostatic transmitter according to claim 1 wherein said trigger voltage supply means comprises a voltage divider, a tap on said divider coupled to control conduction of the switching device.

8. An anticipating thermostatic transmitter according to claim 1 wherein said deflecting means comprises a heater.

9. An anticipating thermostatic transmitter according to claim 1 wherein said switching device is in series with the deflecting means.

10. An anticipating thermostatic transmitter according to claim 1 wherein said switching device shorts out the deflecting means.

* * * * *